(12) United States Patent
Endo

(10) Patent No.: US 7,637,472 B2
(45) Date of Patent: Dec. 29, 2009

(54) MUFFLER HANGER

(75) Inventor: Masami Endo, Niwa-gun (JP)

(73) Assignees: Tokai Rubber Industries, Ltd., Komaki-shi (JP); Honda Motor Co., Ltd., Tokyo (JP)

( * ) Notice: Subject to any disclaimer, the term of this patent is extended or adjusted under 35 U.S.C. 154(b) by 39 days.

(21) Appl. No.: 12/213,681

(22) Filed: Jun. 23, 2008

(65) Prior Publication Data

US 2009/0001242 A1    Jan. 1, 2009

(51) Int. Cl.
*F16M 13/00* (2006.01)
(52) U.S. Cl. .................. 248/610; 248/613; 248/59; 248/60; 180/309; 181/208; 267/293
(58) Field of Classification Search .......... 248/62, 248/58, 65, 544, 610, 613, 632, 634, 635, 248/636, 611, 59, 60; 267/293, 140.12, 141.4, 267/141.1, 292, 281, 140.11, 140, 141; 181/207, 181/209, 243, 114, 212, 227, 228; 180/309, 180/296, 69.1, 69.2, 89.2, 189
See application file for complete search history.

(56) References Cited

U.S. PATENT DOCUMENTS

| | | | | |
|---|---|---|---|---|
| 2,074,092 A | * | 3/1937 | Mapes et al. | 248/610 |
| 2,612,370 A | * | 9/1952 | Ernst | 267/292 |
| 2,647,717 A | * | 8/1953 | Avery et al. | 267/141 |
| 2,760,747 A | * | 8/1956 | Mordarski | 267/141.1 |
| 4,116,411 A | * | 9/1978 | Masuda | 248/60 |
| 4,157,227 A | * | 6/1979 | Hahle | 403/228 |
| 4,415,391 A | * | 11/1983 | Reid | 156/187 |
| 4,494,722 A | * | 1/1985 | Kanai et al. | 248/621 |
| 4,634,088 A | * | 1/1987 | Schad | 248/60 |
| 4,638,965 A | * | 1/1987 | De Bruine et al. | 248/59 |
| 4,660,797 A | * | 4/1987 | Tonnies | 248/610 |
| 4,727,957 A | * | 3/1988 | Fujita | 181/208 |
| 4,817,909 A | * | 4/1989 | Deane | 248/610 |
| 4,893,778 A | * | 1/1990 | Drabing et al. | 248/610 |
| 5,032,342 A | * | 7/1991 | Drabing et al. | 264/263 |
| 5,050,837 A | | 9/1991 | Hamada et al. | |
| 5,082,252 A | * | 1/1992 | Miyamoto | 267/140.13 |

(Continued)

FOREIGN PATENT DOCUMENTS

EP    529250 A1 *  3/1993

(Continued)

*Primary Examiner*—Kimberly T Wood
(74) *Attorney, Agent, or Firm*—Oliff & Berridge, PLC

(57) ABSTRACT

A muffler hanger including: a rubber annular portion; a rubber arm constituting an elastic support portion for the muffler; an upper space and a lower space for permitting deformation of the rubber arm; a first mounting hole disposed in a center of the rubber arm in a vehicle left-right direction to extend in a vehicle front-back direction when installed on the vehicle, and attached in a mated condition to a support pin provided on one of a muffler side and a vehicle body side; and a pair of second mounting holes disposed at locations away to right and left sides from the first mounting hole to extend in the front-back direction, and attached in a mated condition to support pins on the other side. The first and second mounting holes are arranged to form a row in the left-right direction, with positional relationships such that when installed on the vehicle the holes overlaps one another as viewed in the left-right direction.

10 Claims, 8 Drawing Sheets

U.S. PATENT DOCUMENTS

| | | | |
|---|---|---|---|
| 5,271,595 A * | 12/1993 | Simon et al. | 248/632 |
| 5,364,061 A * | 11/1994 | Ciolczyk et al. | 248/610 |
| 5,829,732 A * | 11/1998 | Yamaguchi et al. | 248/610 |
| 5,944,297 A * | 8/1999 | Flower et al. | 248/638 |
| 6,264,164 B1 * | 7/2001 | Steinmaier | 248/610 |
| 6,343,777 B1 * | 2/2002 | Andra | 248/610 |
| 6,402,119 B1 * | 6/2002 | Miska | 248/613 |
| 6,454,236 B2 * | 9/2002 | Garaud et al. | 248/635 |
| 6,622,975 B2 * | 9/2003 | Steinmaier | 248/60 |
| 6,626,413 B1 * | 9/2003 | Kakimoto et al. | 248/610 |
| 6,739,557 B2 | 5/2004 | Kato | |
| 6,851,506 B2 * | 2/2005 | Bovio | 180/296 |
| 7,575,216 B2 * | 8/2009 | Zimmermann et al. | 248/610 |
| 2003/0173489 A1 * | 9/2003 | Kakimoto et al. | 248/610 |
| 2004/0262460 A1 * | 12/2004 | Molnar et al. | 248/60 |

FOREIGN PATENT DOCUMENTS

| | | | |
|---|---|---|---|
| JP | A 62-289428 | | 12/1987 |
| JP | 01223024 A | * | 9/1989 |
| JP | 05172174 A | * | 7/1993 |
| JP | Y2 6-12185 | | 3/1994 |
| JP | 08232974 A | * | 9/1996 |
| JP | 11082624 A | * | 3/1999 |
| JP | 2000-120784 A | | 4/2000 |
| JP | 2000-130510 A | | 5/2000 |
| JP | 2003301884 A | * | 10/2003 |
| JP | A 2003-278541 | | 10/2003 |

\* cited by examiner

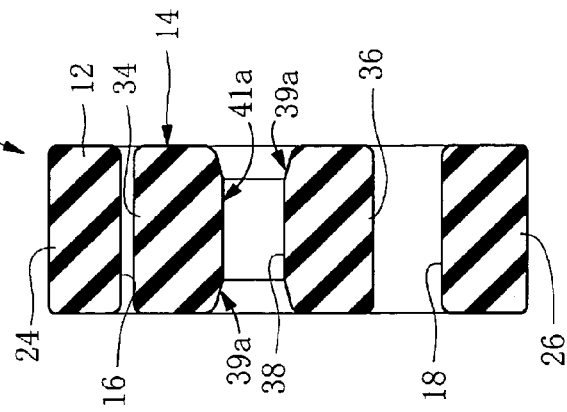
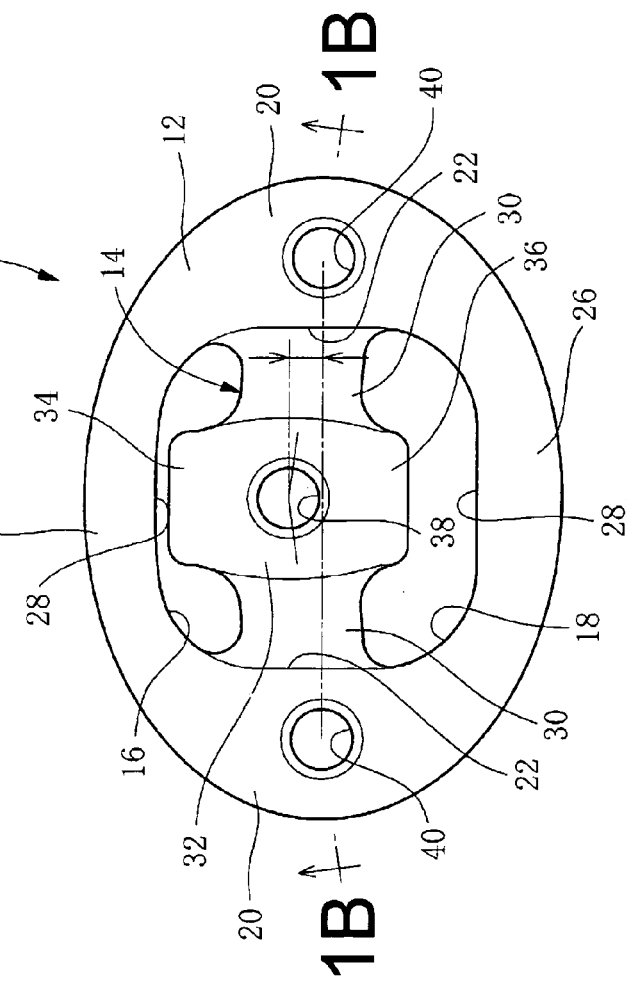

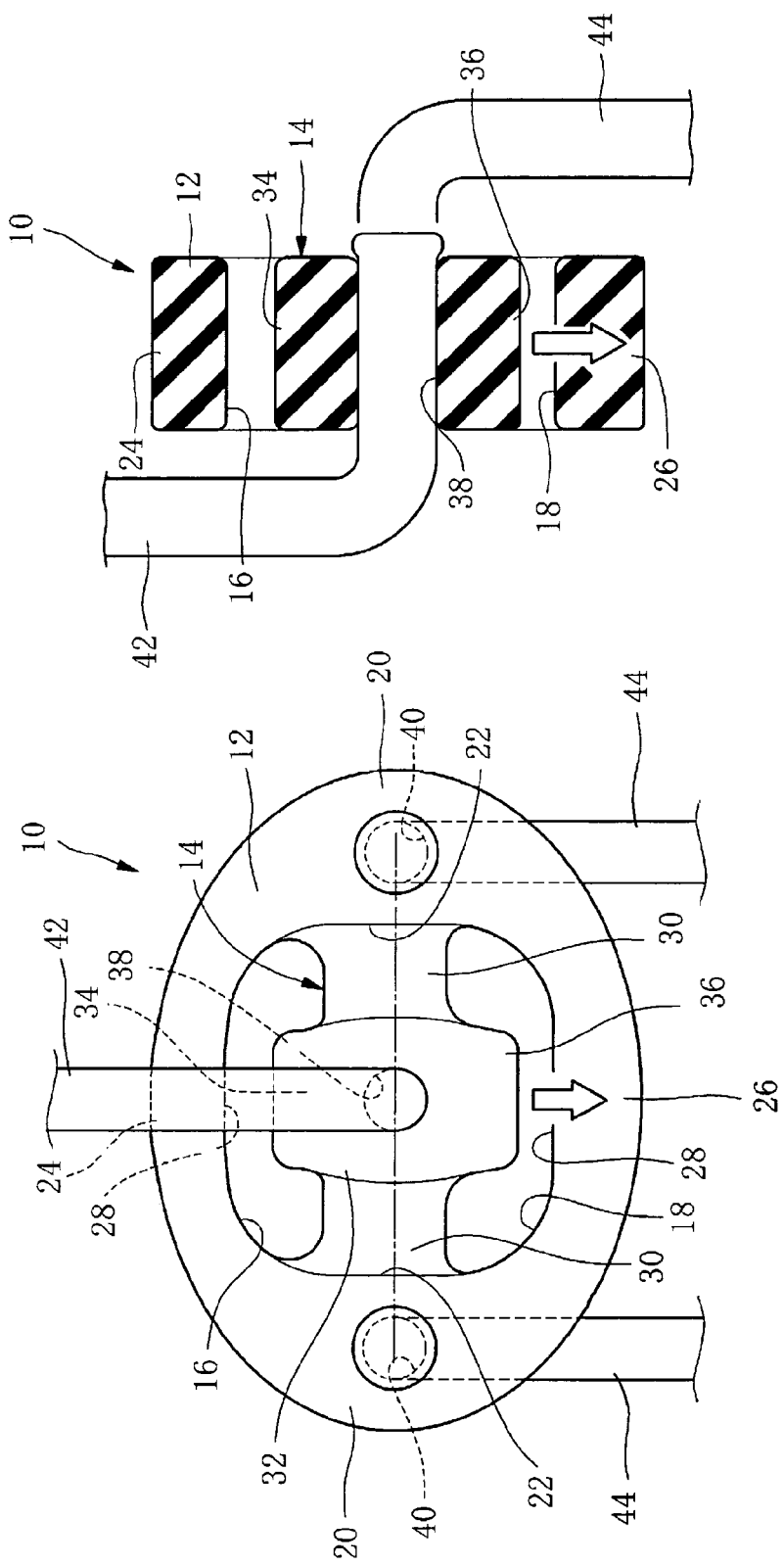

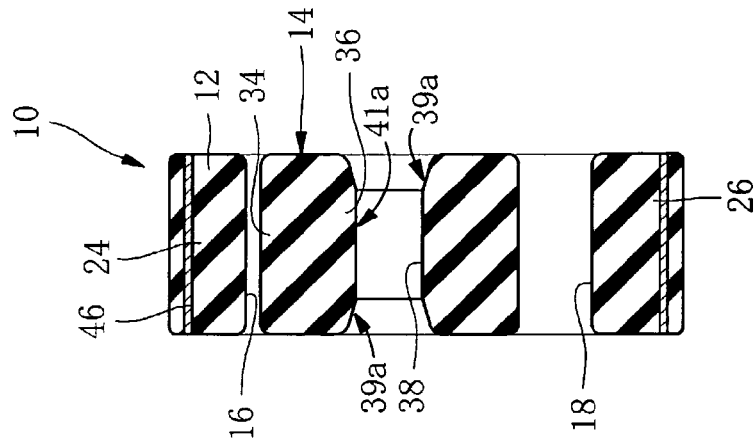
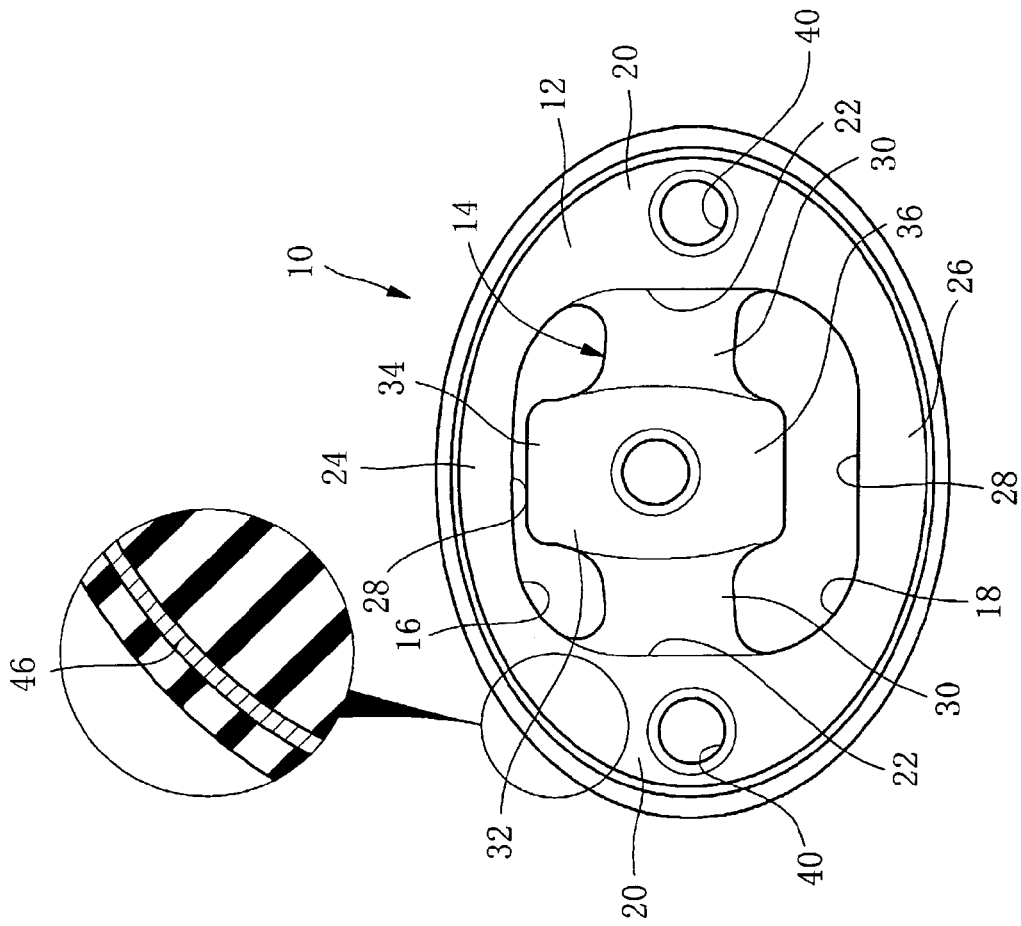

PRIOR ART

PRIOR ART

PRIOR ART

PRIOR ART

MUFFLER HANGER

BACKGROUND OF THE INVENTION

1. Field of the Invention

This invention relates to a muffler hanger adapted for elastically suspending the muffler of the exhaust system of an automotive vehicle, and for absorbing vibration between the muffler and the vehicle body.

2. Description of the Related Art

The function of a muffler hanger of this kind is to prevent up-and-down or vertical vibration of the exhaust system components, including the muffler and exhaust pipe, from being transmitted over to the vehicle body, while at the same time providing elastic support to the suspended muffler. In order to satisfactorily realize this function, the conventional muffler hangers have been designed so as to minimize as much as possible its spring rigidity in the vertical direction, i.e. to make the muffler hangers as flexible as possible in the vertical direction.

FIG. 5 depicts by way of specific example the design disclosed in U.S. Pat. No. 5,050,837. In FIG. 5, 200 denotes a muffler hanger composed of a rubber elastic body having a "θ" shape as a whole. More specifically, the muffler hanger 200 includes: a longwise ellipse-like rubber portion 202 which extend continuously in the circumferential direction; and a connecting rubber portion 204 which interconnects vertically-medial regions of the longwise ellipse-like rubber portion 202 in the left-right direction (i.e. the vehicle left-right direction). In the inside area of the longwise ellipse-like rubber portion 202, an upper space 206 and a lower space 208 are formed respectively to the upper side and the lower side of the connecting portion 204. Upper and lower mounting holes 210, 212 are formed so as to respectively pass through the upper end and the lower end of the rubber annular portion 202 in the front-back direction. In addition, stopper projections 214, 216 are provided for the purpose of limiting excessive displacement of the rubber annular portion 202 in the vertical direction.

This muffler hanger 200 composed of a rubber elastic body is adapted to be attached in the manner depicted in FIG. 5B, so that a support pin 218 on the vehicle body side mates with the upper mounting hole 210 and a support pin 220 on the muffler side mates with the lower mounting hole 212 to elastically support the muffler in the suspended state while providing vibration-absorbing action between the vehicle body and the muffler.

Due to the presence of the upper space 206 and the lower space 208, this muffler hanger 200 as a whole readily gives rise to elastic deformation in the vertical direction. That is, spring rigidity in the vertical direction is low, and accordingly the hanger can flexibly and elastically support the muffler in the vertical direction.

It is difficult for the muffler hanger 200 shown in FIG. 5 to elastically support a muffler by itself. For this reason, when endeavoring to elastically support a muffler using this muffler hanger 200, a pair of the muffler hangers 200 will be disposed on the diagonal in a "V-letter" configuration for use so as to elastically support the muffler 222 as depicted in FIG. 6. The use of a pair of the muffler hangers 200 to elastically support the muffler 222 in this way is disclosed in JP-A-2003-278541.

However, elastically supporting the muffler 222 in this way requires the use of two of the muffler hangers 200, resulting in the problem of an increased number of parts. Also, this muffler 222 creases problems in terms of ride comfort of the vehicle, owing to weak bearing force with respect to motion (swaying) of the muffler 222 in the vehicle left-right direction.

For example, as the vehicle drives through a curve, the vehicle body will sway outward slightly due to centrifugal force. If the bearing force of the muffler hanger 200 in the lateral direction (vehicle left-right direction) is too weak, the muffler 222 will not move in unison with the vehicle body at this time, but will instead move outward after a delay. When the vehicle subsequently exits the curve to resume driving on a straight path, and the vehicle body resumes its original attitude, the muffler will return to its original position after a delay. The movement of the muffler 222 at this time will be transmitted with a delay to the vehicle body, and ride comfort for the persons on the cabin will suffer as a result.

While the muffler hanger 200 depicted in FIGS. 5 and 6 is composed of a rubber elastic body, muffler hangers of designs incorporating metal fittings have been proposed as well. FIG. 7 shows by way of example the hanger disclosed in U.S. Pat. No. 6,739,557.

In FIG. 7, 226 is a metal fitting provided to a muffler hanger 224 and including a mounting plate 229, a pair of side plates 230, and a base plate 232. To the pair of side plates 230, the ends of rubber arms 227 which splay in an inverted "V-letter" configuration are respectively integrally affixed through vulcanization bonding. 228 is a mounting hole.

In the case of the muffler hanger 224 with the metal fitting shown in FIG. 7, since the rubber arms 227 splay in the inverted "V-letter" configuration, even where the hanger is used alone it will be possible for it to elastically support the muffler 222 in similar manner to that shown in FIG. 6. Consequently, the required number of muffler hangers 224 can be reduced. Moreover, the muffler hanger 224 depicted in FIG. 7 affords the advantage of higher bearing force of the muffler 222 in the left-right direction, i.e. higher spring rigidity in the left-right direction, as compared with the one shown in FIGS. 5 and 6.

However, in the case of the muffler hanger 224 with the metal fitting shown in FIG. 7, since the metal fitting 226 is one of the required components, in the process of manufacture of the muffler hanger 224 a vulcanization bonding step will be necessary in order to bond the metal fitting with the rubber arms 227 made of a rubber elastic body, resulting in the problem of a more complex manufacturing process and associated higher cost.

With the muffler hanger 224 depicted in FIG. 7, while spring rigidity in the left-right direction, i.e. bearing force in the left-right direction, is higher compared with that of the hanger shown in FIGS. 5 and 6, it does still not achieve a sufficiently high spring ratio of spring rigidity in the left-right direction to spring rigidity in the vertical direction. This makes it impossible for example to prevent to a sufficient extent the aforementioned problem encountered when the vehicle travels through a curve, while at the same time maintaining low spring rigidity in the vertical direction.

JP-A-62-289428 discloses a muffler hanger directed to addressing this problem. FIG. 8 illustrates a specific example. In FIG. 8, 234 is a muffler hanger made of a rubber elastic body, 236 is a rubber arm of bowed shape, 238 denotes holes for mounting to the vehicle body; 240 is a hole for mounting to the muffler, 242 is a vertical direction stopper portion, and 244 is the floor of the vehicle body.

However, with the muffler hanger 234 shown in FIG. 8, if input occurs in the lateral direction, the rubber arm 236 will experience appreciable shear deformation to absorb the input, and consequently the muffler hanger 234 depicted in FIG. 8 also lacks sufficient spring rigidity in the left-right direction, making it difficult to sufficiently avoid the aforementioned problem encountered when the vehicle travels through a curve.

JP-Y-6-12185 discloses another muffler hanger of a design intended to be fastened through mounting at three points to the vehicle body and to the muffler. However, the hanger disclosed in JP-Y-6-12185 differs from that taught in the present invention.

SUMMARY OF THE INVENTION

It is therefore one object of this invention to provide an inexpensive muffler hanger composed of a rubber elastic body having low spring rigidity in the vertical direction and high spring rigidity in the left-right direction.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the present invention provides a muffler hanger composed of a rubber elastic body, adapted to elastically hang a muffler from a floor of a vehicle body of an vehicle and to absorb vibration between the muffler and the vehicle body, the muffler hanger including: (a) a rubber annular portion of continuous ring shape in the circumferential direction; (b) a rubber arm integrally formed with the rubber annular portion so as to interconnect vertically-medial regions of the rubber annular portion in a vehicle left-right direction, and constituting an elastic support portion for the muffler which extends in the left-right direction; (c) an upper space and a lower space formed between the rubber arm and the rubber annular portion for permitting deformation of the rubber arm; (d) a first mounting hole disposed in a center of the rubber arm in the vehicle left-right direction so as to extend in a vehicle front-back direction when installed on the vehicle, and adapted to be attached in a mated condition to a support pin provided on one of a muffler side and a vehicle body side; and (e) a pair of second mounting holes disposed at locations away to right and left sides from the first mounting hole so as to extend in the vehicle front-back direction when installed on the vehicle, and adapted to be attached in a mated condition to support pins provided on an other of the muffler side and the vehicle body side, wherein the first mounting hole and the second mounting holes are arranged to form a row in the vehicle left-right direction, with positional relationships such that when installed on the vehicle the holes overlaps one another as viewed in the vehicle left-right direction, wherein the rubber arm is disposed between opposing faces of the first mounting hole and the second mounting holes in the vehicle left-right direction, and wherein sections of the rubber annular portion that face the rubber arm from above and below constitute outer stopper portions for limiting displacement of the rubber arm in a vertical direction.

A second mode of the invention provides a muffler hanger according to the first mode, wherein the second mounting holes are disposed in the rubber annular portion.

A third mode of the invention provides a muffler hanger according to the first or second mode, wherein the rubber arm is provided with inner stoppers which project upward and downward from the center portion thereof in the left-right direction.

A fourth mode of the invention provides a muffler hanger according to any one of claims 1-3, wherein the first mounting hole and the second mounting holes are disposed to form a row in the left-right direction such that when installed on the vehicle, offset of hole centers in the vertical direction will fall within a range of ±6 mm.

A fifth mode of the invention provides a muffler hanger according to the fourth mode, wherein the first mounting hole and the second mounting holes are positioned such that the hole centers thereof are situated on a horizontal straight line.

A sixth mode of the invention provides a muffler hanger according to any one of the first through fifth modes, wherein the rubber annular portion has an outside peripheral shape of ellipsoidal, and an inside peripheral shape of rectangular.

A seventh mode of the invention provides a muffler hanger according to any one of the first through sixth modes, wherein a minimum thickness in a vehicle front-back direction of the outer stopper portions is greater than a minimum thickness in the vehicle front-back direction of parts of the rubber arm which are disposed between the first mounting hole and the second mounting holes.

An eighth mode of the invention provides a muffler hanger according to any one of the first through seventh modes, wherein each of the first mounting hole and the second mounting holes is designed such that both axial open ends thereof are tapered portions having a diameter gradually increasing toward the open end, and an axially medial part thereof has a diameter smaller than an outside diameter of the support pin.

A ninth mode of the invention provides a muffler hanger according to any one of the first through eighth modes, wherein the muffler hanger is formed entirely of a rubber elastic body only.

A tenth mode of the invention provides a muffler hanger according to any one of the first through ninth modes, wherein a restraining member for limiting vertical displacement at times of stopper action by the outer stopper portions is embedded within the rubber annular portion so as to extend around the entire circumference thereof.

As set forth hereinabove, the present invention resides in a muffler hanger composed of a rubber elastic body having a rubber arm extending in the vehicle left-right direction in vertically-medial regions of a rubber annular portion of continuous ring shape in the circumferential direction, and having a first mounting hole in the center portion of the rubber arm and second mounting holes situated away to the right and left sides therefrom such that the first and second mounting holes extends in the vehicle front-back direction with the muffler hanger installed on the vehicle. The first mounting hole is attached in a mated condition to a support pin provided on one of the muffler side and the vehicle body side, and the second mounting holes attached in a mated condition to support pins provided on the other of the muffler side and the vehicle body side. The first mounting hole and the second mounting holes are arranged to form a row in the vehicle left-right direction, with positional relationships such that when installed on the vehicle the holes overlaps one another as viewed in the vehicle left-right direction, and the rubber arm is disposed between opposing faces of the first mounting hole and the second mounting holes in the vehicle left-right direction.

The muffler hanger of the present invention affords a design which is both inexpensive and which allows the rubber arm to elastically deform easily in the vertical direction due to the presence of the upper space and the lower space above and below the rubber arm. Moreover, in the process, the rubber arm will primarily experience shear elastic deformation and absorb input in the vertical direction, so that spring rigidity in the vertical direction will be low (soft), thereby affording good absorption of vibration of the muffler in the vertical direction while effectively reducing or preventing transmission of vertical vibration of the muffler to the vehicle body.

Meanwhile, in response to input in the left-right direction, the rubber arm will primarily experience compressive elastic deformation, and thus in the process spring rigidity in the left-right direction will become quite high. This allows the motion of the muffler to better track the motion of the vehicle body when, for example, the vehicle drives around a curve, thereby ameliorating the adverse effects on ride comfort of such delayed movement of the muffler relative to the vehicle body.

In the present invention, the ability to achieve low spring rigidity in the vertical direction and high spring rigidity in the left-right direction is due primarily to the fact that the rubber arm extends in the left-right direction while being disposed between the first and second mounting holes, and the first mounting hole and the pair of second mounting holes are positioned to form a row in the left-right direction.

In the present invention, when the rubber arm undergoes elastic deformation up and down, the spring rigidity is low, i.e. soft. However, according to the teachings of the present invention, outer stoppers are provided for limiting displacement of the rubber arm in the vertical direction, thus making it possible to effectively prevent durability from suffering resulting from excessive displacement of the rubber arm in the vertical direction.

According to the present invention, the both longitudinal ends of the rubber arm are integrally formed with the rubber annular portion. Therefore, when the rubber arm deformation become large, this arrangement makes it possible to effectively transmit to the outer stopper portions of the rubber annular portion strain generated at the connecting part between the rubber arm and the rubber annular portion due to the elastic deformation of the rubber arm. This causes elastic deformation of the outer stopper portions of the rubber annular portion. As a result, the muffler hanger is able to exhibit non-linear spring characteristics.

Thus, when the large deformation of the rubber arm is caused, the present muffler hanger is able to reduce or moderate the deformation of the rubber arm owing to its non-linear spring characteristics of the muffler hanger. When the rubber arm undergoes further excess large deformation, the deformation of the rubber arm can be restricted by means of abutting contact against the outer stopper portions.

Here, the pair of second mounting holes can be disposed in the rubber annular portion (Second Mode). By so doing, the rubber arm as a whole can be induced to undergo elastic deformation in response to input in the vertical direction, and spring rigidity in the vertical direction can be effectively lowered.

The rubber arm can be provided with internal stopper portions projecting upward and downward from its center portion in the left-right direction (Third Mode). By providing the rubber arm with such stopper portions, soft stopper characteristics can be achieved at times of stopper action.

In the present invention, in preferred practice the first mounting hole and the second mounting holes will be disposed to form a row in the left-right direction such that when installed on the vehicle, offset of the hole centers in the vertical direction will fall within a range of ±6 mm (Fourth Mode). In particular, it is preferable for the first mounting hole and the second mounting holes to be positioned such that the hole centers thereof are situated on a horizontal straight line (Fifth Mode).

Preferably, the rubber annular portion has an outside peripheral shape of ellipsoidal, and an inside peripheral shape of rectangular. (Sixth Mode). This arrangement makes it possible to give the largest vertical dimension of the outer stopper portions at the center in the vehicle left-right direction, resulting in ensuring durability of the outer stopper portions. In this arrangement, the parts of the rubber annular portion, which are opposed to each other in the left-right direction have the largest horizontal dimension at the center in the vertical direction. Thus, if the rubber arm is connected to the rubber annular portion at the center of the rubber annular portion in the vertical direction, the present arrangement ensures durability of the connecting portions between the rubber arm and the rubber annular portion. Additionally, when the second mounting holes are formed at vertically center portions of the horizontally opposite parts of the rubber annular portions, respectively, the second mounting holes can be formed with a sufficient space utilization.

In another preferred practice, a minimum thickness in a vehicle front-back direction of the outer stopper portions is greater than a minimum thickness in the vehicle front-back direction of parts of the rubber arm which are disposed between the first mounting hole and the second mounting holes (Seventh Mode). This arrangement makes it possible to provide soft spring characteristics of the rubber arm, while ensuring sufficient durability of the outer stopper portions of the rubber annular portion as well as sufficient shape stability of the rubber annular portion.

In another preferred practice, each of the first mounting hole and the second mounting holes is designed such that both axial open ends thereof are tapered portions having a diameter gradually increasing toward the open end, and an axially medial part thereof has a diameter smaller than an outside diameter of the support pin (Eighth Mode). With this arrangement, the tapered portions formed at the both axial open ends of each hole permits easy insertion of the support pins. Furthermore, the both axial open ends are provided with the tapered portions, the support pins can be readily inserted from both the front and back sides of the holes, thereby ensuring efficient assembly of the muffler hanger to the vehicle. In addition, the inside diameter of each hole is made smaller at the axially medial portion, so that a securing force based on elasticity of the rubber elastic body can be applied to the support pin inserted into the mounting hole, thereby ensuring the mating or coupling state of the support pins with respect to the first mounting hole and the second mounting holes with sufficient stability.

In another preferred practice, the muffler hanger is formed entirely of a rubber elastic body only (Ninth Mode). With this arrangement, the muffler hanger can be manufactured with ease and with light weight.

In another preferred practice, the rubber annular portion has embedded around its entire circumference a restraining member for limiting vertical displacement at times of stopper action by the outer stopper portions (Tenth Mode). With this arrangement, the rubber annular portion, and more specifically the portions of the rubber annular portion which face the rubber arm from above and below, will be effectively prevented from experiencing appreciable deformation in the vertical direction at times of stopper action by the outer stopper portions, thereby providing more effective action in limiting excessive displacement of the rubber arm in the vertical direction. As an alternative form, the restraining member may be embedded in suitable circumferential portions. This makes it possible to tune the spring characteristics of the muffler hanger suitably, or to reinforce the muffler hanger.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein:

FIGS. 1A, 1B and 1C are views showing a muffler hanger of construction according to a first embodiment of the present invention, in a state prior to installation in a vehicle;

FIGS. 2A and 2B are views showing the muffler hanger of the first embodiment, in a state installed in the vehicle;

FIGS. 4A and 4B are views showing a muffler hanger of construction according to a second embodiment of the present invention;

DETAILED DESCRIPTION OF PREFERRED EMBODIMENTS

Figure 3:
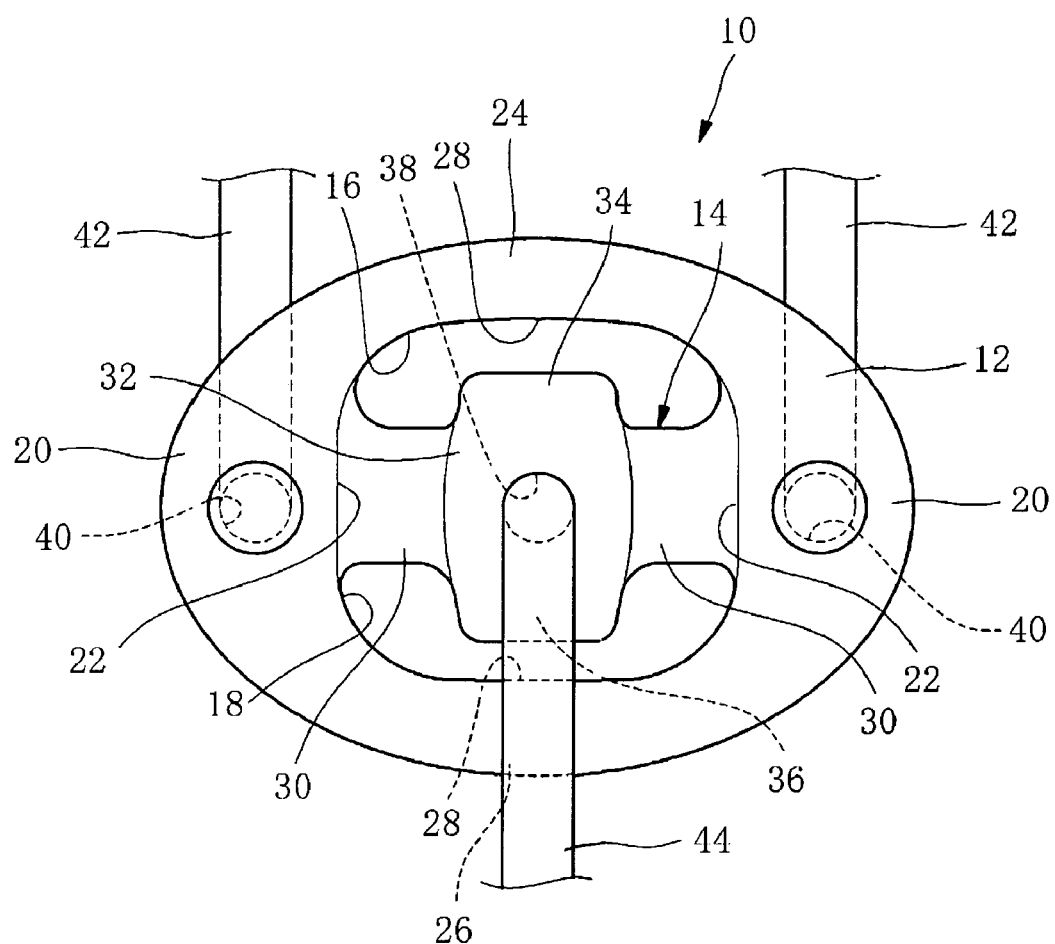
FIG. 3 is a view showing the muffler hanger of the first embodiment that is installed in the vehicle in a condition different from the state shown in FIGS. 2A and 2B.
Figure 5A:
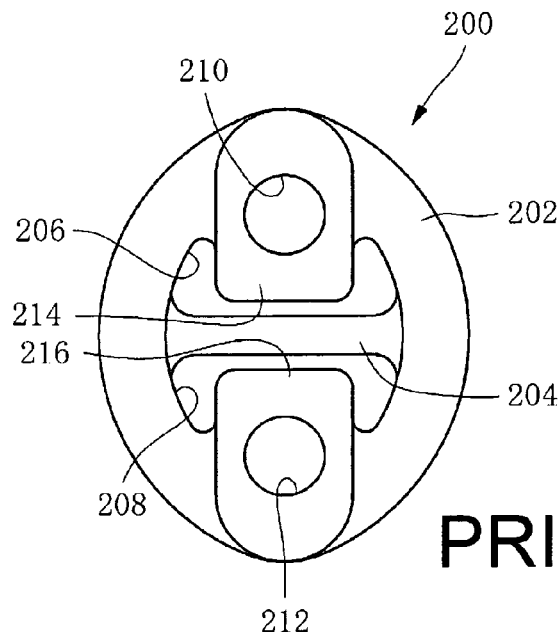
FIGS. 5A, 5B and 5C are views showing a conventional muffler hanger composed of a rubber elastic body only.
Figure 5B:
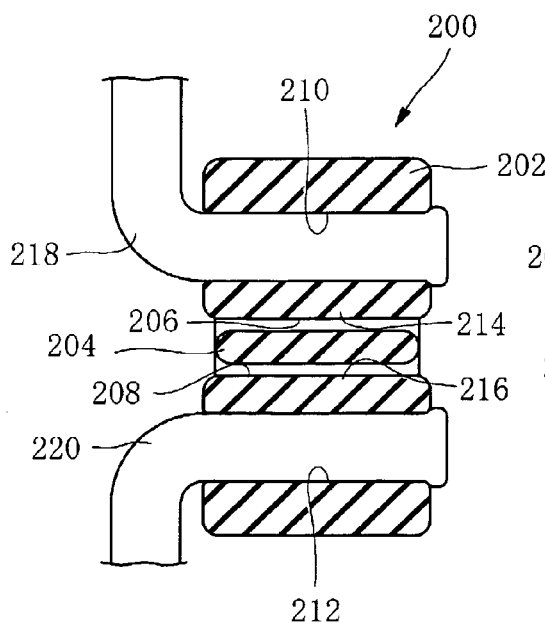
Figure 5C:
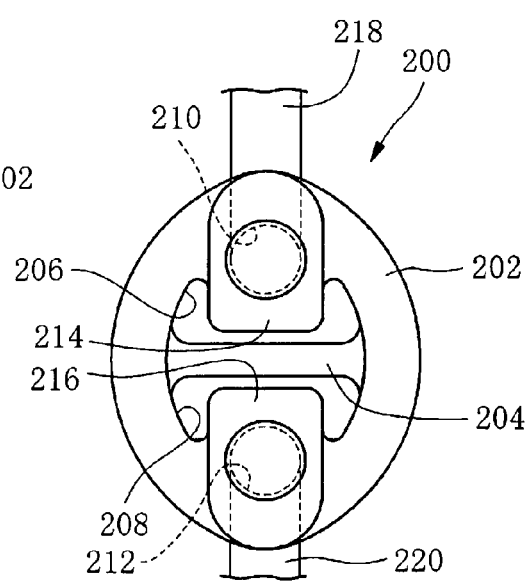
Figure 6:
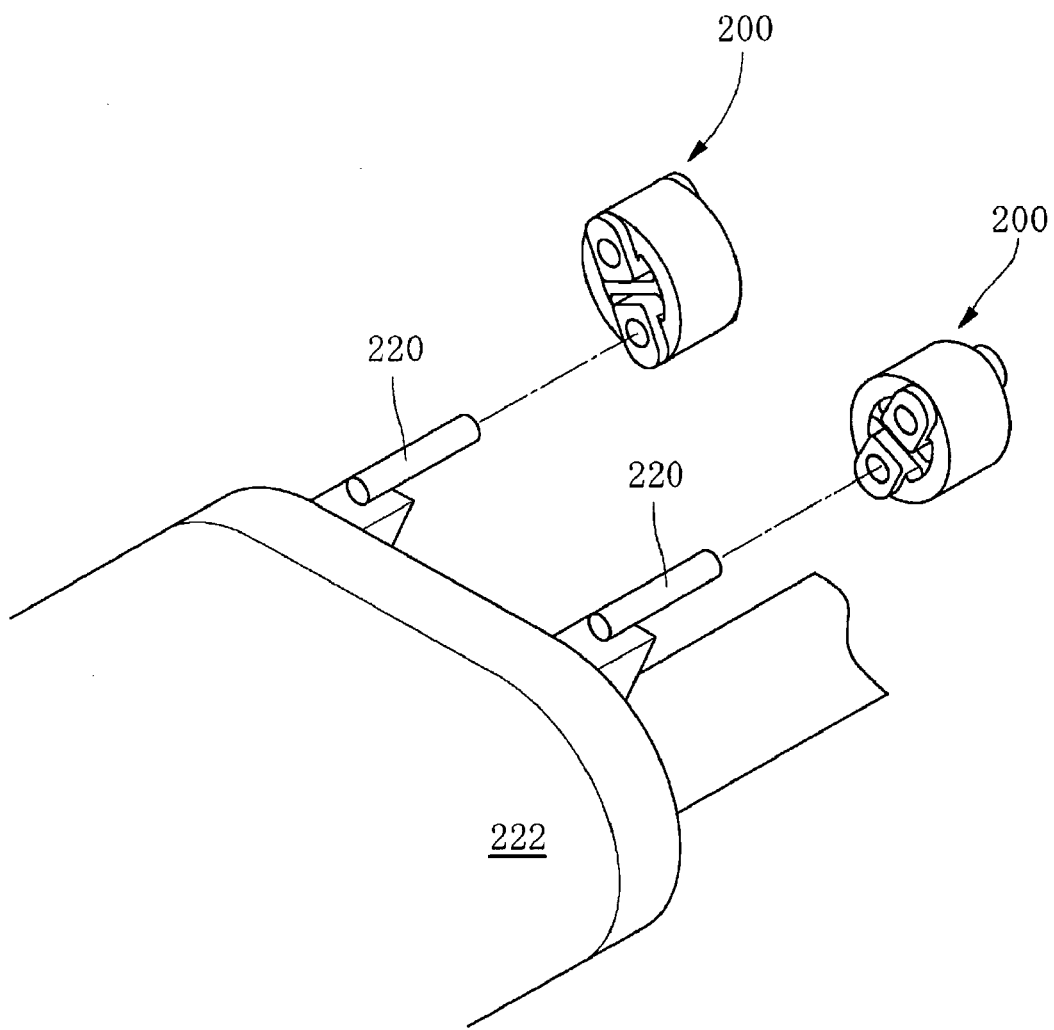
FIG. 6 is a view showing a structure for mounting a muffler using the muffler hanger of FIG. 5.
Figure 7:
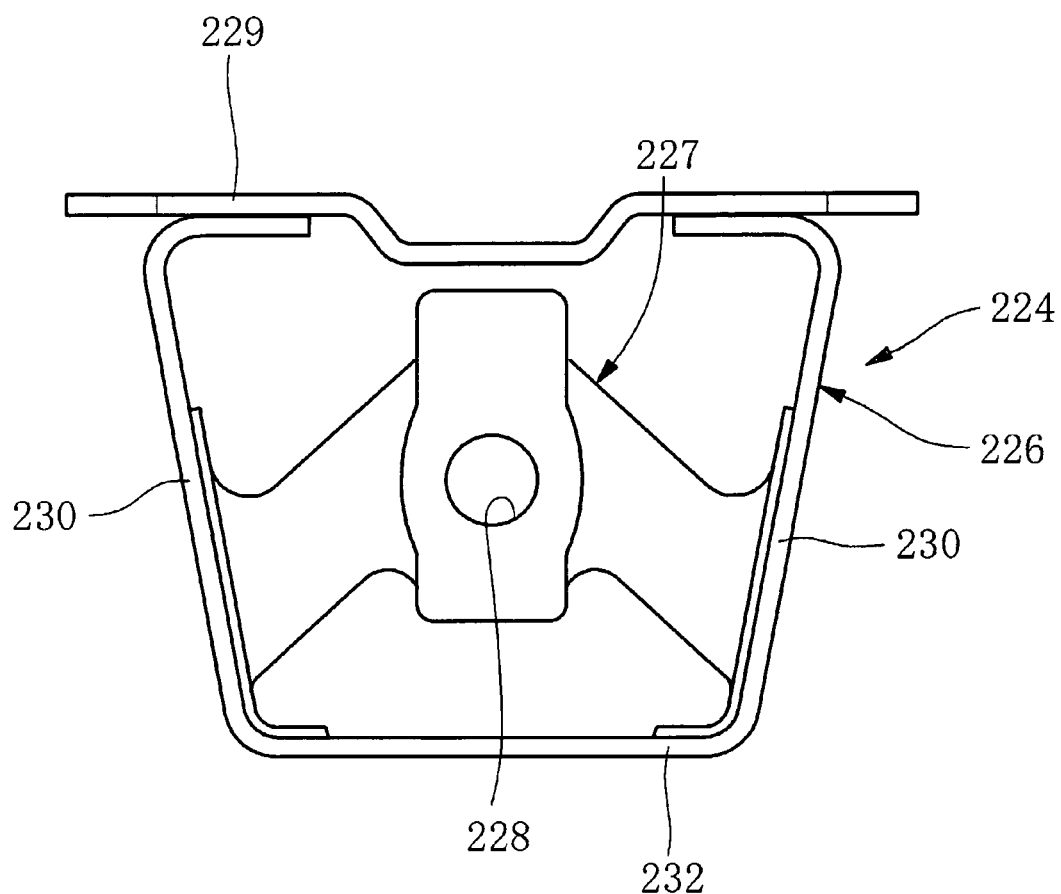
FIG. 7 is a view showing by way of example a conventional muffler hanger with a metal fitting.
Figure 8:
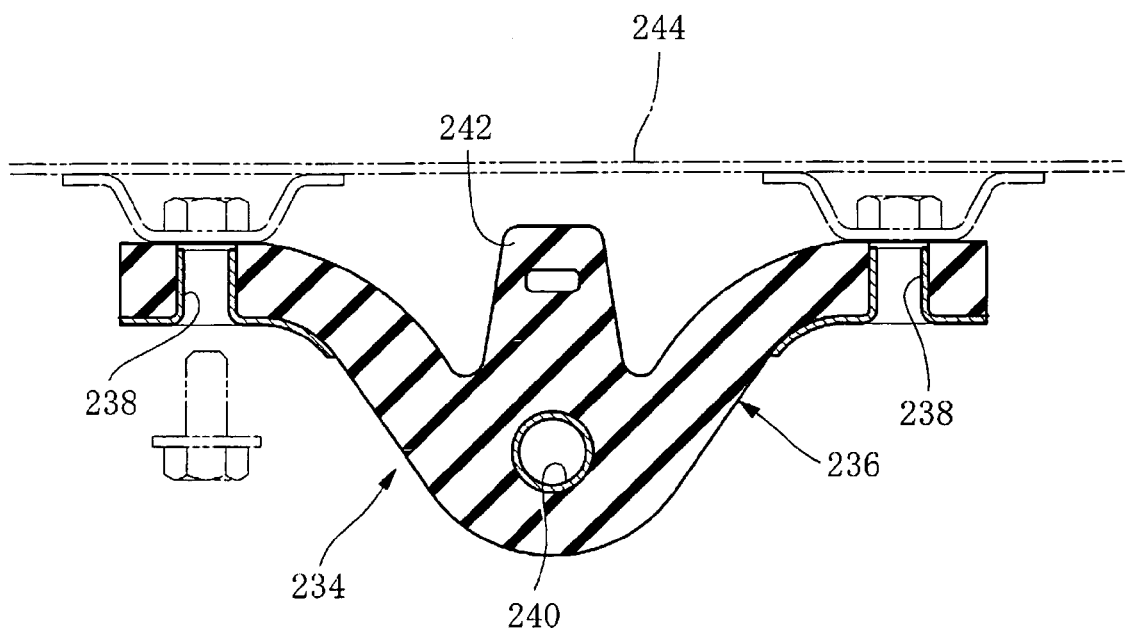
FIG. 8 is a view showing another example of a conventional muffler hanger.

FIGS. 1A-1C depict a muffler hanger 10 according to the embodiment, shown prior to installation in the vehicle. In FIG. 1A, the vertical direction in the drawing coincides with the actual vertical direction of the vehicle, and the left-right direction in the drawing coincides with the actual left-right direction of the vehicle.

The muffler hanger 10 according to the embodiment is composed of a rubber elastic body which includes a rubber annular portion 12 of continuous ring shape in the circumferential direction, a single rubber arm 14 which interconnects vertically-medial regions of the rubber annular portion 12 in left-right direction, and an upper space 16 and a lower space 18 formed above and below the arm. The rubber arm 14 constitutes an elastic support portion for the muffler, and is integrally formed with the rubber annular portion 12 so as to extend in the left-right direction.

The rubber annular portion 12 has a peripheral shape of horizontally elongated elliptical shape of greater length in the left-right direction, in a front elevational view. In this rubber annular portion 12, expanded width portions 20 are situated at the left and right ends and expand in width in the same direction. The expanded width portions 20 have inside peripheral shapes which are straight in shape. In the drawing, 22 denotes the straight sections. In the present embodiment, the dimension in the left-right direction of the expanded width portions 20 is largest at the center in the vertical direction.

Meanwhile, the upper and lower portions respectively define an upper stopper portion 24 and a lower stopper portion 26 which function as outer stopper portions that will come into contact with and limit displacement by the rubber arm 14, and more specifically its stopper portions 34, 36 (discussed later) in the event that the rubber arm 14 experiences appreciable displacement in the vertical direction.

The upper stopper portion 24 and the lower stopper portion 26 have inside peripheral shape which is straight in the left-right direction. In the drawing, 28 denotes the straight sections. In the present embodiment, the dimension in the vertical direction of the upper stopper portion 24 and the lower stopper portion 26 is largest at the center in the left-right direction. The straight sections 28 on the inside peripheral side of the upper stopper portion 24 and the lower stopper portion 26 connect via curving surfaces to the straight sections 22 on the inside peripheral side of the expanded width portions 20. That is, the rubber annular portion 12 has an inside peripheral shape of rectangular having around corners.

The rubber arm 14 has a pair of left and right principle portions 30, and a central thick portion 32 which projects out beyond the principle portions 30 in the left-right direction and the front-back direction. The upward projecting section and downward projecting section of this thick portion 32 respectively constitute the upper and lower stopper portions 34, 36 provided as the inner stopper portions on the rubber arm 14 side.

The respective upper face and lower face of the upper stopper portion 34 and the lower stopper portion 36 have straight contours in the left-right direction, corresponding to the straight sections 28 of the upper stopper portion 24 and the lower stopper portion 26 which are provided on the rubber annular portion 12. However, the upper stopper portion 24 and the lower stopper portion 26 could instead have inside peripheral contours of rounded peak shape which towards their center portion in the left-right direction progressively project downward or upward, respectively. Alternatively, the upper stopper portion 34 and the lower stopper portion 36 on the rubber arm 14 side could have upper and lower surface contours of rounded peak shape which towards their center portion in the left-right direction progressively project upward or downward, respectively.

A first mounting hole 38 is formed in the left-right center portion of the rubber arm 14, passing through it in the front-back direction. At locations in the rubber annular portion 12 situated respectively to the right side and the left side away from the first mounting hole 38, more specifically, in its expanded width portions 20, there are respectively formed a pair of second mounting holes 40 passing through in the front-back direction. The first mounting hole 38 and the second mounting holes 40 respectively have at both axial open ends tapered portions 39a, 39b having a diameter gradually increasing toward the open ends. Also, the first mounting hole 38 and the second mounting holes 40 respectively have at their axially medial portions straight portions 41a, 41b, respectively. The straight portions 41a, 41b has an inside diameter smaller than an outside diameter of support pins 42, 44 which will be described later. In the embodiment, the first mounting hole 38 and the second mounting holes 40 are defined by holes of identical size. They may differ in size as well.

FIG. 2 depicts the muffler hanger 10 installed in the vehicle. In the drawing, 42 represents a support pin which faces upward from the vehicle body, and 44 represents support pins which extend upward from the muffler hanger side. In the case shown in FIG. 2, the muffler hanger 10 is attached with the first mounting hole mated with the support pin 42 on the vehicle body side, and the muffler hanger 10 is attached with the second mounting holes mated with the pair of left and right support pins 44 on the muffler side.

In the present embodiment, the tapered portions 39a, 39b are provided at both axial open ends of the first mounting hole 38 and the second mounting holes 40, having a diameter gradually increasing toward the open ends, permitting readily insertion of the support pins 42, 44 into the first and second mounting holes 38, 40. In particular, the both axial open ends are provided with the tapered portions 39a, 39b, respectively, the support pins can be readily inserted from both the front and back sides of the holes, thereby ensuring efficient assembly of the muffler hanger 10 to the vehicle.

In the present embodiment, the straight portions 41a, 41b are formed at the axial medial portions of the first mounting hole 38 and the second mounting holes 40, respectively, each having an inside diameter smaller than the outside diameter of the support pins 42, 44, making it possible to apply the mating or coupling force based on the elastic deformation of the rubber elastic body against the support pins 42, 44. Thus, the state of coupling of the support pins 42, 44 can be stabilized.

When subsequently installed on the vehicle, with the weight of the muffler, exhaust pipe, etc. acting in the downward direction on the muffler hanger 10 the first mounting hole 38 and the pair of left and right second mounting holes 40 will become arrayed in a row in the horizontal direction so as to define a single straight line in left to right. That is, in this embodiment, the three mounting holes, i.e. the first mounting hole 38 and the pair of left and right second mounting holes 40, are disposed in positional relationships such that, with the hole centers aligned, the holes will overlap top to bottom in the vertical direction, or as viewed in the vehicle left-right direction. In the installed condition on the vehicle, the locations of the hole centers of the first mounting hole 38 and the second mounting holes 40 may be offset in the vertical direction within a range of ±6 mm. In this state, the principle portions 30 of the rubber arm 14 are disposed between the first mounting hole 38 and the pair of second mounting holes 40, respectively.

While in FIG. 2, the first mounting hole 38 is shown mated with the support pin 42 on the vehicle body side and the pair of left and right second mounting holes 40 are shown mated with the support pins 44 on the muffler side, it would also be possible to attach the muffler hanger 10 with the first mounting hole 38 mated with a support pin 44 that extends upward from the muffler side, and with the pair of left and right second mounting holes 40 mated with a pair of support pins 42 that extend downward from the vehicle body side, as depicted in FIG. 3.

In the muffler hanger 10 of the embodiment, input in the vertical direction is absorbed through elastic deformation of the rubber arm 14 in the vertical direction. At this point, input in the vertical direction is substantially absorbed through shear elastic deformation. Consequently, spring rigidity in the vertical direction will be low. On the other hand, in response to input in the left-right direction, the rubber arm 14 will undergo compressive elastic deformation, or more precisely, compression on one side and stretching on the other. Consequently, spring rigidity in the left-right direction will be high. For this reason, when the muffler vibrates in the vertical direction in association with driving of the vehicle, good absorption of this vibration will be afforded due to the low spring rigidity of the rubber arm 14 in the vertical direction, thus effectively reducing or preventing vibration of the muffler from being transmitted to the vehicle body.

Meanwhile, at times that the muffler experiences relative displacement in the vehicle left-right direction with respect to the vehicle, due to the high spring rigidity of the muffler hanger 10, and more specifically of the rubber arm 14, in the left-right direction (i.e. the high level of bearing force in the left-right direction on the muffler), relative displacement of the muffler in the left-right direction can be effectively prevented.

In the present embodiment, since the muffler hanger 10 is formed of a rubber elastic body only, the wider displacement of the rubber mar 14 in the vertical direction will cause excessive strain at the connecting parts between the principle portions 30 of the rubber arm 14 and the expanded width portions 20 of the rubber annular portion 12. As a result, this strain will be transmitted to the upper and lower stopper portions 34, 36. The upper and lower stopper portions 34, 36 will undergo compression/tensile deformation, resulting in a non-linear spring characteristics of the muffler hanger 10, and thus restricting or minimizing excess displacement of the rubber arm 14.

Additionally, when the rubber arm 14, which is flexible in the vertical direction, experiences further appreciable relative displacement in this same direction, the stopper action will be exhibited by contact between the upper stopper portions 34 and 24, or alternatively by contact between the lower stopper portions 36 and 26. This stopper action will prevent effectively excessive displacement of the rubber arm 14 in the vertical direction. Consequently, despite its soft spring rigidity in the vertical direction, the muffler hanger 10 of the present embodiment is endowed with high durability to repeated displacement in the vertical direction.

In the present embodiment, the second mounting holes 40 are formed at the expanded width portions 20 of the rubber annular portion 12 that is located in the vertical center and have the largest left-right dimension, making it possible to obtain a space for forming the second mounting holes 40 through the rubber annular portion 12.

Furthermore, since the second mounting holes 40 are formed through the expanded width portions 20 of the rubber annular portion 12, this makes it possible to undergo the entire rubber arm 14 elastic deformation in the vertical direction. This readily makes it possible to reduce or minimize spring characteristics in the vertical direction of the rubber arm 14.

Additionally, the upper stopper portion 34 and the lower stopper portion 36 have the largest vertical dimension at the central portion in the left-right direction, thereby ensuring durability of the upper stopper portion 34 and the lower stopper portion 36.

In the present embodiment, the dimension in the front-back direction is made greater at the upper and lower stopper portions 24, 26 of the rubber annular portion 12 rather than at the principle portions 30 of the rubber arm 14, whereby the rubber arm 14 will exhibit soft spring characteristics in the vertical direction and the upper and lower stopper portions 24, 26 of the rubber annular portion 12 will exhibit sufficient durability effectively. In addition, the rubber annular portion 12 is able to exhibit enhanced shape stability.

In the present embodiment, the muffler hanger 10 is entirely formed of a rubber elastic body only, so that the muffler hanger 10 can be readily manufactured with the reduced weight.

FIG. 4 illustrates an alternative embodiment of the present invention. In this embodiment, the rubber annular portion 12 is provided in proximity to its outside peripheral section a restraining member 46 of ring shape embedded around the entire circumference to restrain the rubber annular portion 12 and limit deformation in the vertical direction at times of the aforementioned stopper action. As the ring-shaped restraining member 46 it would be possible to use a ring of iron or other metal, or a resin ring; a restraining ring 46 made of metal wire or cloth could be used as well. In the present embodiment, the sections of the rubber annular portion 12 which face the rubber arm 14 from above and below effectively inhibit deformation in the vertical direction at times of stopper action, affording more effective action in limiting excessive displacement of the rubber arm 14 in the vertical direction.

The embodiments of the present invention set forth in detail hereinabove are merely exemplary. While in the preceding embodiments, the first mounting hole 38 and the pair of second mounting holes 40 are positioned so as to be disposed on a straight line in the left-right direction when installed on the vehicle, in some instances it will be possible, for example, for the first mounting hole 38 and the second mounting holes 40 to be positioned with their hole centers situated within a range of ±6 mm in the vertical direction. The restraining member 46 may be formed partially in the circumferential direction. This makes it possible to tune the spring characteristics of the muffler hanger suitably, or alternatively to reinforce the muffler hanger. It is also to be understood that the present invention may be embodied with various changes, modifications and improvements which may occur to those skilled in the art, without departing from the spirit and scope of the invention.

What is claimed is:

1. A muffler hanger composed of a rubber elastic body, adapted to elastically hang a muffler from a floor of a vehicle body of an automotive vehicle and to absorb vibration between the muffler and the vehicle body, the muffler hanger comprising:
    (a) a rubber annular portion of continuous ring shape in the circumferential direction;
    (b) a rubber arm integrally formed with the rubber annular portion so as to interconnect vertically-medial regions of the rubber annular portion in a vehicle left-right direction, and constituting an elastic support portion for the muffler which extends in the left-right direction;
    (c) an upper space and a lower space formed between the rubber arm and the rubber annular portion for permitting deformation of the rubber arm;
    (d) a first mounting hole disposed in a center of the rubber arm in the vehicle left-right direction so as to extend in a vehicle front-back direction when installed on the vehicle, and adapted to be attached in a mated condition to a support pin provided on one of a muffler side and a vehicle body side; and
    (e) a pair of second mounting holes disposed at locations away to right and left sides from the first mounting hole so as to extend in the vehicle front-back direction when installed on the vehicle, and adapted to be attached in a mated condition to support pins provided on an other of the muffler side and the vehicle body side,
    wherein the first mounting hole and the second mounting holes are arranged to form a row in the vehicle left-right direction, with positional relationships such that when installed on the vehicle the holes overlaps one another as viewed in the vehicle left-right direction,
    wherein the rubber arm is disposed between opposing faces of the first mounting hole and the second mounting holes in the vehicle left-right direction, and
    wherein sections of the rubber annular portion that face the rubber arm from above and below constitute outer stopper portions for limiting displacement of the rubber arm in a vertical direction.

2. The muffler hanger according to claim 1, wherein the second mounting holes are disposed in the rubber annular portion.

3. The muffler hanger according to claim 1, wherein the rubber arm is provided with inner stoppers which project upward and downward from the center portion thereof in the left-right direction.

4. The muffler hanger according to claim 1, wherein the first mounting hole and the second mounting holes are disposed to form a row in the left-right direction such that when installed on the vehicle, offset of hole centers in the vertical direction will fall within a range of ±6 mm.

5. The muffler hanger according to claim 4, wherein the first mounting hole and the second mounting holes are positioned such that the hole centers thereof are situated on a horizontal straight line.

6. The muffler hanger according to claim 1, wherein the rubber annular portion has an outside peripheral shape of ellipsoidal, and an inside peripheral shape of rectangular.

7. The muffler hanger according to claim 1, wherein a minimum thickness in a vehicle front-back direction of the outer stopper portions is greater than a minimum thickness in the vehicle front-back direction of parts of the rubber arm which are disposed between the first mounting hole and the second mounting holes.

8. The muffler hanger according to claim 1, wherein each of the first mounting hole and the second mounting holes is designed such that both axial open ends thereof are tapered portions having a diameter gradually increasing toward the open end, and an axially medial part thereof has a diameter smaller than an outside diameter of the support pin.

9. The muffler hanger according to claim 1, wherein the muffler hanger is formed entirely of a rubber elastic body only.

10. The muffler hanger according to claim 1, wherein a restraining member for limiting vertical displacement at times of stopper action by the outer stopper portions is embedded within the rubber annular portion so as to extend around an entire circumference thereof.

* * * * *